(12) United States Patent
Saathof (10) Patent No.: US 11,215,511 B2
(45) Date of Patent: Jan. 4, 2022

(54) WAVEFRONT DETECTOR

(71) Applicant: Nederlandse Organisatie voor toegepast-natuurwetenschappelijk onderzoek TNO, s-Gravenhage (NL)

(72) Inventor: Rudolf Saathof, Nieuwegein (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/763,857

(22) PCT Filed: Nov. 20, 2018

(86) PCT No.: PCT/NL2018/050775
§ 371 (c)(1),
(2) Date: May 13, 2020

(87) PCT Pub. No.: WO2019/103602
PCT Pub. Date: May 31, 2019

(65) Prior Publication Data
US 2020/0284661 A1    Sep. 10, 2020

(30) Foreign Application Priority Data
Nov. 21, 2017   (EP) .................................... 17202729

(51) Int. Cl.
*G01J 9/02*    (2006.01)
*G01N 21/45*   (2006.01)
*G01J 9/04*    (2006.01)

(52) U.S. Cl.
CPC . *G01J 9/02* (2013.01); *G01J 9/04* (2013.01); *G01N 21/45* (2013.01)

(58) Field of Classification Search
None
See application file for complete search history.

(56) References Cited

U.S. PATENT DOCUMENTS 6,229,616 B1    5/2001   Brosnan et al.
9,019,485 B2 *  4/2015   Ignatovich ......... G01M 11/0235
                                                            356/73

(Continued)

OTHER PUBLICATIONS

Glen C. Cole, et al., "Vibration stabilization of a phase-shifting interferometer for large optics", SPIE Defense and Security Symposium; Mar. 16-20, 2008; Orlando, Florida, United States, US, (19971101), vol. 3134, doi:10.1117/12.279132, ISSN 0277-786X, ISBN 978-1-5106-1723-0, pp. 438-446, [X] 1,2,9,12-15 * figures 1-3** p. 439, paragraph 3-paragraph 4 * [Y] 3-6,8,11 [I] 7,10, (XP055482190).

(Continued)

*Primary Examiner* — Violeta A Prieto
(74) *Attorney, Agent, or Firm* — Leydig, Voit & Mayer, Ltd.

(57) ABSTRACT

A wavefront detector (100) and method for determining a signal wavefront (Ws) of a signal beam (Ls). A beam combiner (11) is configured to combine the signal beam (Ls) with a reference beam (Lr). An image detector (12) comprising an array of photosensitive pixels (12p) is configured to receive and measure an interference pattern (Wrs) of the combined signal and reference beams (Lr+Ls). A reference light source (14) is configured to generate the reference beam (Lr). A feedback controller (20) is configured to receive an interference signal ($I_B$) based on measurement of at least part of the combined signal and reference beams (Lr+Ls), and control generation of the reference beam (Lr) by a feedback loop based on the interference signal ($I_B$).

20 Claims, 4 Drawing Sheets

(56) References Cited

U.S. PATENT DOCUMENTS

2011/0235049 A1    9/2011  Burnett et al.
2014/0253907 A1*   9/2014  Ignatovich ......... G01M 11/0285
                                                          356/73
2020/0350737 A1*  11/2020  Beresnev ........... G02B 27/0961

OTHER PUBLICATIONS

Horst Schreiber, et al., "Phase Shifting Interferometry", Optical Shop Testing, Moore, (19740101), pp. 547-666, doi:10.1002/9780470135976.ch14, ISBN 978-0-47-148404-2, [A] 7 * paragraph [14.7] (XP055137914).

Tomasz Kawalec, et al., "Two-laser interference visible to the naked eye; Two-laser interference visible to the naked eye", European Journal of Physics, Institute of Physics Publishing, Bristol, GB, (20111107), vol. 33, No. 1, doi:10.1088/0143-0807/33/1/007, ISSN 0143-0807, pp. 85-90, [Y] 3-6,8 * figure 2 (XP020216253).

Dong Wu, et al., "Transverse spatial phase-shifting method used in vibration-compensated interferometer", Optik, Wissenschaftliche Verlag GMBH, DE, (20040101), vol. 115, No. 8, doi:10.1078/0030-4026-00380, ISSN 0030-4026, pp. 343-346, [X] 1,10,15 * figure 2 ** p. 343, paragraph 2 * [I] 7 (XP005256287).

Matt Novak, et al., "Analysis of a Micropolarizer Array-Based Simultaneous Phase-Shifting Interferometer", Applied Optics, Optical Society of America, Washington, DC; US, (20051110), vol. 44, No. 32, doi:10.1364/A0.44.006861, ISSN 0003-6935, pp. 6861-6868, [Y] 11 * figures 1,2 (XP001235535).

European Patent Office, International Search Report in corresponding International Application No. PCT/NL2018/050775, dated May 16, 2019 (2 pages).

Walter R. Leeb, "Optical Phased Array Antennas for Free Space Laser Communications," SPIE vol. 2210, pp. 14-29 (1994).

V. Vilnrotter, "Optical Array Receiver for Communication Through Atmospheric Turbulence," Journal of Lightwave Technology, vol. 23, No. 4, pp. 1664-1675 (Apr. 2005).

* cited by examiner

WAVEFRONT DETECTOR

CROSS-REFERENCE TO RELATED APPLICATIONS

This patent application is a U.S. National Phase of PCT International Application No. PCT/NL2018/050775, filed Nov. 20, 2018, which claims priority to European Application No. 17202729.4 filed Nov. 21, 2017, which are both expressly incorporated by reference in their entireties, including any references contained therein.

TECHNICAL FIELD AND BACKGROUND

The present disclosure relates to a wavefront detector and method of detecting a wavefront.

U.S. Pat. No. 6,229,616 B1 discloses a heterodyne wavefront detector that uses a radio frequency (RF) signal for measuring an optical wavefront having a state of phase that differs throughout its aperture. It comprises a lens, optical fiber and optical frequency shifter arrangement to develop a reference optical wavefront having substantially the same phase throughout and that is shifted in frequency by an amount corresponding to the RF. A beam combiner interferometrically combines the optical wavefront and the shifted reference optical wavefront into a heterodyne optical signal at the RF frequency, each sub-aperture of which has a phase that corresponds to the state of phase of a like sub-aperture of the optical wavefront. An array of lenses focuses the optical heterodyne signal into an array of photodetectors, each responsive to a sub-aperture and that produces an electrical signal at the optical beat frequency corresponding to the RF and having a phase corresponding to the state of phase of the corresponding sub-aperture of the optical wavefront. A plurality of circuit chains, each including a digital divider, responds to the RF signal and a corresponding one of the array of electrical signals and with an exclusive OR circuit and an integrating circuit develops a like plurality of output signals that comprise voltages that linearly correspond to the state of optical phase of a sub-aperture of the optical wavefront. The composite output signals represent the optical state of phase of the incoming optical wavefront.

Unfortunately, known techniques for measuring wavefront deformations have either a too limited spatial resolution or have a too small frequency operating bandwidth to measure dynamic phase (i.e. wavefront) disturbances.

SUMMARY

Aspects of the present disclosure relates to a wavefront detector and method for determining a signal wavefront of a signal beam. The signal beam may be received from an external light source which may be distant from the detector. For example, a signal beam received from a satellite may experience wavefront distortion in the atmosphere which can be measured by the detector and possibly compensated, e.g. in a measured or returned beam. The wavefront detector typically comprises a beam combiner configured to receive the signal beam and combine the signal beam with a reference beam generated by a reference light source. The reference beam is typically generated locally and may have a known, e.g. flat wavefront for interfering with the wavefront of the signal beam to be determined. For example, an internal reference light source may be integrated into the detector or directly coupled thereto. The detector may comprise an image detector with an array of photosensitive pixels configured to receive and measure an interference pattern of the combined signal and reference beams. Since the internal reference light source may operate separate and/or independent from the external light source, there may be variable differences, apart from the wavefront, between the signal and reference beams which can affect on the interference pattern to be measured. For example, an (average) phase, frequency, and/or polarization of the reference light beam may be different from the signal light beam. Advantageously, a feedback controller may be configured to receive an interference signal based on measurement of at least part of the combined signal and reference beams, and control generation of the reference beam by a feedback loop based on the interference signal. In particular, the characteristics of the reference beam such its frequency, (average) phase and/or polarization may be adapted relative to those of the signal beam.

It will be appreciated that by using a feedback loop for generating the reference light based on the combined signal and reference signals, the reference light can be accurately controlled and adapted to a possibly erratic signal, e.g. having a desired relative frequency, phase and/or polarization. By measuring a beat signal of the interference, a difference frequency between the signal and reference beams can be determined and controlled. For example, the feedback can be used to set the beat frequency to zero or used to set the beat frequency to desired value, most advantageously coupled to a sampling frequency of the image detector. Also the interference signal can be used to determine and/or set a relative phase For example, the relative phase can be controlled in steps to record different interferograms from which the optical phases can be calculated. For example, the relative phase can be measured and used as input in the calculation of the optical phases throughout the received aperture of the incident signal beam.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

Phase-Stepping Interferometry (PSI), is one technique used in the analysis of interference patterns generated by multiple beam interferometry. PSI generally involves variation of the phase between beams within the interferometer by a controlled amount. For example, an article by Buytaert and Dirckx in J. Opt. (July-September 2011) 40(3):114-131 (DOI 10.1007/s12596-011-0044-y) provides a "Study of the performance of 84 phase-shifting algorithms for interferometry".

Without being bound by theory, phase calculation in PSI is typically based on the fact that the intensity $I_{RS}(x,y)$ at a point (x,y) in an interferogram between a reference (R) an signal (S) beam is the result of interference of their two wavefronts (Wr,Ws). In an illustrative example, let an intensity $I_{RS}$ of an interferogram between the two electrical fields Wr and Ws be written as $$I_{RS}=|Wr+Ws|^2$$

For example, let Wr be a known reference phase front and Ws an unknown signal phase front to be determined. For simplicity assume that the light of both wavefronts has the same optical frequency $\omega s$ and the reference phase front is independent of the (x,y) coordinates, i.e. a flat wavefront.

$$Ws=\sin[\omega_s t+\Phi_S(x,y)]$$

$$Wr=\sin[\omega_s t-\Phi_R]$$

Let the measured interferograms between the wavefronts have a mean intensity $I_0$ and visibility V which can be defined as $$V=(I_{max}-I_{min})/(I_{max}+I_{min})$$

Then the expression for the interferogram can be written as:

$$I_{RS}(x,y)=I_0\{1+V\cos[\Phi_R-\Phi_S(x,y)]\},$$

For example, the interferogram $I_{RS}(x,y)$ will be maximal at pixels where $\Phi_R=\Phi_S(x,y)$, i.e. the signal is completely in phase with the reference and minimal where $\Phi_R=\Phi_S(x,y)+\pi$, i.e. completely out of phase, and other values there between. Using the trigonometric relation $\cos(A-B)=\cos A\cdot\cos B+\sin A\cdot\sin B$, the expression for the interferogram can be rewritten as $$I_{RS}(x,y,\Phi_R)=I_0+I_0V\cos[\Phi_R]\cos[\Phi_S(x,y)]+I_0V\sin[\Phi_R]\sin[\Phi_S(x,y)]$$

For example, in an N-step phase stepping algorithm the reference phase can be varied as:

$$\Phi_R=(n-1)2\pi/N \text{ with } n=1,2,\ldots N$$

Each interferogram in an N-step series can be multiplied by a weighting factor based on a cosine or sine of the reference phase $\Phi_R$ and the weighted interferograms added together in respective sums a(x,y) and b(x,y). It can be shown e.g. using the orthogonality relationships for sine and cosine functions that these sums equal:

$$a(x,y)=\Sigma I_{RS}(x,y,\Phi_R)\cdot\cos[\Phi_R]=\frac{1}{2}NI_0V\cos[\Phi_S(x,y)],$$

$$b(x,y)=\Sigma I_{RS}(x,y,\Phi_R)\cdot\sin[\Phi_R]=\frac{1}{2}NI_0V\sin[\Phi_S(x,y)]$$

So from these expressions the optical phase can be isolated using $$\Phi_S(x,y)=\tan^{-1}[a(x,y)/b(x,y)]$$

For example, in a 4-step (bucket) algorithm, the reference phase is varied between the values $\Phi_R=0, \pi/2, \pi, 3\pi/2$ while the corresponding interferograms $I_{RS}(x,y,\Phi_R)$ are measured. Also other stepping algorithms can be used and the phase may even be varied continuously. For example, the optical frequencies of the signal and reference beams can be different which may be equivalent to a continuously varying phase difference.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
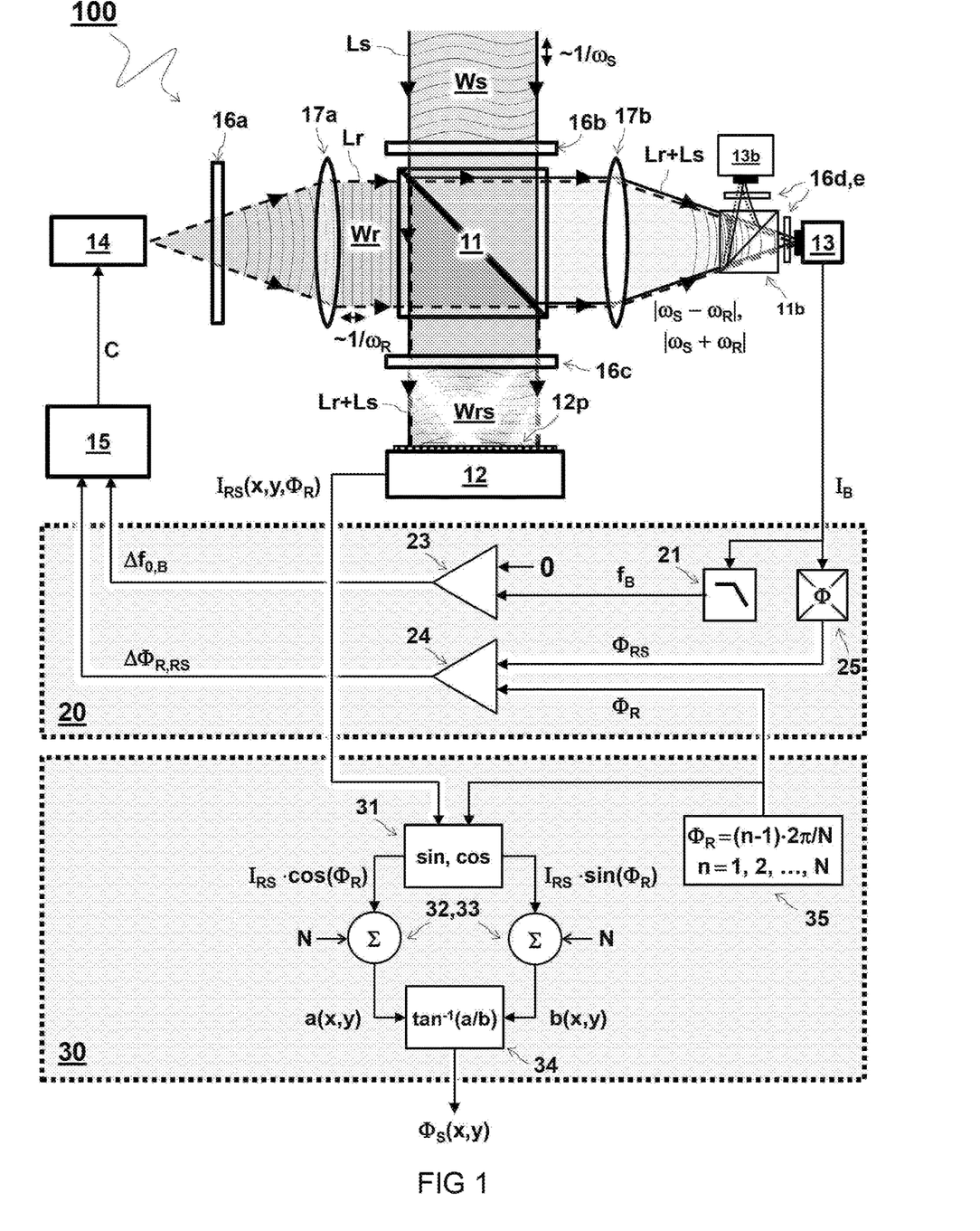
FIG. 1 schematically illustrates a first embodiment of a wavefront detector.

FIG. 1 schematically illustrates a first embodiment of a wavefront detector (100).

In the embodiment shown, the wavefront detector 100 is configured to determine a signal wavefront Ws of a signal beam Ls, more specifically the (two dimensional) optical phase $\Phi_S(x,y)$ of the signal wavefront Ws, e.g. relative to a 'flat' reference wavefront. As shown, the signal beam Ls may be received from an external light source, i.e. separate from the detector. In a preferred embodiment, a beam combiner 11 is configured to combine the signal beam Ls with a reference beam Lr. In the embodiment shown, the beam combiner 11 comprises a combiner/splitter mirror, e.g. polarizing mirror or semi-transparent mirror. Alternative to using a mirror, it can also be envisaged that the beam combiner comprises other means for overlapping the beams or at least their projected images.

In some embodiments, the interference signal $I_B$ is measured by a photodetector 13 configured to receive an integrated image of the combined signal and reference beams Lr+Ls. Preferably, the photodetector 13 is configured to measure all light of the combined signal and reference beams Lr+Ls which is split off in this case by the beam combiner 11 acting also as beam splitter. For example, the photodetector 13 has a relatively large detection surface, e.g. more than hundred micrometer diameter, more than half a millimeter diameter, e.g. between one and five millimeter, or more. This is contrasted e.g. with typical single-mode optical fiber which only has a core diameter between 8 and 10.5 µm.

In the embodiment shown, the photodetector 13 is separate from the image detector 12 which is preferable. For example, the beam combiner 11 has two output paths, wherein the image detector 12 is arranged in a first output path and the photodetector 13 is arranged in a second output path. Alternatively, or in addition, the interference signal $I_B$ including e.g. the beat frequency $f_B$ can be measured by the image detector 12 itself (not shown here). In one embodiment, the beat frequency $f_B$ is determined from a time variance of the interference pattern Wrs. For example, the time variance is determined from an integrated signal of the interference pattern Wrs. In another or further example, the time variance of each pixel is determined and e.g. an average or median is used to determine the beat frequency $f_B$.

In a preferred embodiment, the separate photodetector 13 has a higher detection frequency than the image detector 12. For example, the photodetector 13 can be a photodiode which may have a relatively fast response time. It will be appreciated that this may relax requirement on the image detector 12. In the embodiment shown, a low pass filter 21 is configured to receive a signal from the photodetector 13 and output the beat frequency $f_B$. Alternatively, or in addition, the photodetector 13 may itself act as a low pass filter, e.g. may typically have a maximum measurement frequency below the optical frequencies $\omega_R$, $\omega_S$ of the light beams Lr,Ls and/or their sum frequency $\omega_R + \omega_S$. So the output of the photodetector 13 and/or low pass filter 21 may effectively comprise an oscillating signal from which the beat frequency $f_B$ is extracted or otherwise used.

In a preferred embodiment, an image detector 12 comprises an array of photosensitive pixels 12$p$ configured to receive and measure an interference pattern Wrs of (in this case one branch of) the combined signal and reference beams Lr+Ls. In some embodiments, a wavefront imager 30 is configured to calculate a plurality of optical phases $\Phi_S$ of the signal wavefront Ws based on the measured interference pattern Wrs. In a preferred embodiment, the wavefront detector 100 comprises a reference light source 14 configured to generate the reference beam Lr. In some embodiments, e.g. as shown, a feedback controller 20 is configured to receive an interference signal $I_B$ based on measurement of at least part of the combined signal and reference beams Lr+Ls. In other or further embodiments, e.g. as shown, the feedback controller 20 is configured to control the frequency generation of the reference beam Lr by a feedback loop based on the interference signal $I_B$.

In principle, the total amount of combined light Lr+Ls in the second path to the photodetector 13 can be lower than in the first path to the image detector 12, because all light in the second path can be concentrated on the (single) detection surface of the photodetector 13. Accordingly, the beam combiner 11 may be configured to pass more light to the first path than the second path. Preferably though, the optical power of the reference beam Lr incident on detector 12 is of the same order as the optical power of the signal beam Ls. Power mismatch either way may be undesired, e.g. Lr power smaller than Ls can be optically inefficient and Lr power much higher than Ls can give a higher DC level on the detector, causing a further increase in dynamic range of the detector.

In some embodiments, instead of a single beam combiner/splitter, multiple optics can be used (not shown). For example, a beam combiner that combines all light and then a beam splitter that splits a fraction e.g. less than ten percent, of the light to the photodetector 13 while passing the rest to the image detector 12. For example, optional filters 16$a$,16$b$ may comprise wave-plates or polarizers to control polarization of the respective beams and the beam combiner 11 may comprise a mirror with polarization reflection coefficient. In other embodiments, this may not be needed, e.g. the reference light source 14 may be configured to directly generate the reference beam Lr with a desired polarization. Also other optional filters 16$c$,16$d$,16$e$ may used at various stages to control or select specific polarizations in some embodiments. In some embodiments, optional lenses 17$a$ and 17$b$ can be used to adjust beam sizes when overlapping the beams. In other embodiments (not shown), this may not be necessary.

Typically, a laser source is preferred as optical monochromatic frequency source. For example, the reference light source 14 is a laser. Optionally, light injection may be provided via a single mode (polarization maintaining) optical fiber (not shown), which acts as an optical pinhole, creating an optimal optical wavefront. In some embodiments, as shown, output of the reference light source 14 is indirectly controlled such as via a light source driver 15 generating a light source control signal C. For example, the light source driver 15 may include a controller determining one or more aspects of the light generation or lasing process. For example, an optical reference frequency $\omega_R$ generated by the laser may be controlled by setting a current or temperature of the laser. For example, a relative or absolute optical phase of the reference beam Lr may be controlled by phase locking the laser or e.g. introducing a variable delay path in the reference beam Lr (not shown). In general, any technique which varies the phase in one or more of the interferometer beams can be used in PSI. The most common techniques include: moving diffraction gratings, moving the reference mirror by use of a PZT, the Bragg effect in an acousto-optic modulator and rotating a half-wave plate in a polarized interferometer. Also, electro-optic modulation e.g. refractive index modulation of an electro-optic crystal can be used to provide high bandwidth and high linearity.

In some embodiments (not shown), the reference light source 14 may include a combination of a laser and an optical modulator. For example, the laser may output a fixed or variable optical frequency which is modulated by other optics in a path of the reference beam Lr to shift the frequency and/or phase as desired. Of course some or all aspects of the light source driver 15, variable path length, optical modulator, et cetera, may be integrated or otherwise be considered part of the reference light source 14 or part of the feedback controller 20.

Preferably, the feedback controller 20 is configured to determine, based on the interference signal $I_B$, a beat frequency $f_B$ of a difference frequency $|\omega_S - \omega_R|$ between an optical signal frequency $\omega_S$ of the signal beam Ls and an optical reference frequency $\omega_R$ of the reference beam Lr, and control the optical reference frequency $\omega_R$ in the generation of the reference beam Lr by a feedback loop based on the beat frequency $f_B$. In some embodiments, a combination of detectors, e.g. photodiodes 13,13$b$ as shown, is configured to determine the interference signal $I_B$ in different polarization directions. For example, when increasing the frequency of the reference beam and observing the resulting beat frequency, it can be determined which of the frequencies is higher. For example, the use of two detectors with a ninety degree phase offset via polarization state can be used to obtain knowledge about the direction of the phase.

In the embodiment shown, the wavefront imager 30 is configured to calculate optical phases $\Phi_S$ of the signal wavefront Ws based on measurements of the interference pattern Wrs. In a preferred embodiment, the feedback controller 20 is configured to control the reference light source 14 to match the optical reference frequency $\omega_R$ with the optical signal frequency $\omega_S$ by generating a feedback control signal to the reference light source 14 to minimize or remove the measured beat frequency $f_B$. For example, in the embodiment shown, the beat frequency $f_B$ is received by a first comparator 23 which generates a first comparison output $\Delta f_{0,B}$ based on a difference of the beat frequency $f_B$ with a zero frequency 0. The generated output $\Delta f_{0,B}$ may be looped back to control the reference light source 14 e.g. via the light source driver 15 or directly (not shown).

In some embodiments, the feedback controller 20 is configured to determine, based on the interference signal $I_B$, a relative optical phase $\Phi_{RS}$ between the reference beam Lr and signal beam Ls and control an optical phase of the reference beam Lr by a feedback loop based on the determined relative optical phase $\Phi_{RS}$. In the embodiment shown, the relative optical phase $\Phi_{RS}$ is determined by phase extractor 25. In one embodiment, the phase may be determined based on relative intensity of the interference signal $I_B$. For example, when there is no phase difference between the average signal and reference beams, the interference signal $I_B$ may be maximal. For example, when the average signal and reference beams are completely out of phase (π radians difference), the interference signal $I_B$ may be minimal. Also other phases may be extracted from the interference signal $I_B$, e.g. by interpolating the intensity between the minimum and maximum values.

In the embodiment shown, the relative optical phase $\Phi_{RS}$ is received by second comparator 24 which generates a second comparison output $\Delta\Phi_{R,RS}$ based on a difference of the relative optical phase $\Phi_{RS}$ with pre-set variable reference phase $\Phi_R$. The generated output $\Delta\Phi_{R,RS}$ may be looped back to control the reference light source 14 e.g. via the light source driver 15, directly to the reference light source 14 (not shown), or by other means, e.g. setting a controllable delay stage (not shown) in a path of the reference beam Lr before combining. For example, the optical phase of the reference beam can be varied in controlled steps and corresponding images recorded. Preferably, the phase-stepping is applied by means of an optical modulator (not shown), e.g. in a path after the beam after the reference light source.

In some embodiments, e.g. as shown, the wavefront detector 100 comprises a phase stepper 35 configured to set a relative optical phase $\Phi_R$ of the reference beam Lr to a sequence of different phase values ($\Phi_R$=(n−1)·2π/N where n=1, 2, . . . , N). For example, for each relative optical phase $\Phi_R$, a respective interferogram $I_{RS}$(x,y, $\Phi_R$) of the combined signal and reference beams Lr+Ls is projected onto the image detector 12 and recorded. In some embodiments, the recorded interferograms are combined to calculate for each pixel 12p of the image detector 12 an optical phase $\Phi_S$(x,y) in the signal beam Ls.

In one embodiment, a sequence of N different interferogram $I_{RS}$(x,y, $\Phi_R$) are used in an N-position phase stepping algorithm, such as a 3 or 4 position phase stepping algorithm, also referred to as bucket algorithm. In the embodiment shown, each interferogram $I_{RS}$ is multiplied by a respective weight factor based on the relative optical phase ΦR. In the embodiment shown, the weight factors comprise the sine or cosine e.g. calculated by the first trigonometric circuit 31 based on an input of the relative optical phase $\Phi_R$. The weighted interferograms $I_{RS}$·cos ($\Phi_R$) and $I_{RS}$·cos($\Phi_R$) can be added by summing circuits 32,33 to yield respective weighted and summed interferograms a(x,y),b(x,y). From the combination of these sums the optical phase $\Phi_S$(x,y) may be calculated, e.g. by taking inverse tangent (arctan) as indicated by block 34.

In some embodiments, e.g. as shown, the relative optical phase $\Phi_R$ can be received from the phase stepper 35. In the embodiment shown, the phase stepper 35 is controlled as part of the wavefront imager 30 to provide desired phase input to the feedback controller 20. Alternatively, the phase stepper 35 could also directly control the relative phase, e.g. by setting a delay stage in a path of the reference beam Lr.

Of course, the various functional blocks as described can be varied and also integrated in other parts. Some functional blocks may be implemented in analog or digital circuitry. Generally, various functions as described herein can be additionally, or alternatively, implemented in hardware and/or software. For example, the feedback controller 20 and/or wavefront imager 30 may be implemented by one or more programs running e.g. on general purpose processors and/or specialized hardware. The processor may be part of a computer system receiving input signals such as the interference signal $I_B$ and sending output signals such as the control signals $\Delta f_{0,B}$ and/or $\Delta\Phi_{R,RS}$.

In one embodiment, a relative optical frequency difference $\omega_S-\omega_R$ and/or relative optical phase $\Phi_{RS}$ between the reference and signal beams Lr,Ls is determined from a combination of two measurements indicative of different polarizations in the combined signal and reference beams Lr+Ls. For example, in the embodiment shown, a second photodetector 13b is used to measure a part the combined signal and reference beams Lr+Ls that is split off by a second beam splitter 11b. The second beam splitter 11b can be a polarizing beam splitter and/or additional polarizing filters 16d, e can be added in the respective beam paths. For example, by setting a (linear) polarization of the reference beam Lr in a different direction than the signal beam Ls the polarization direction of the combined beam may change depending on the relative phase.

Figure 2:
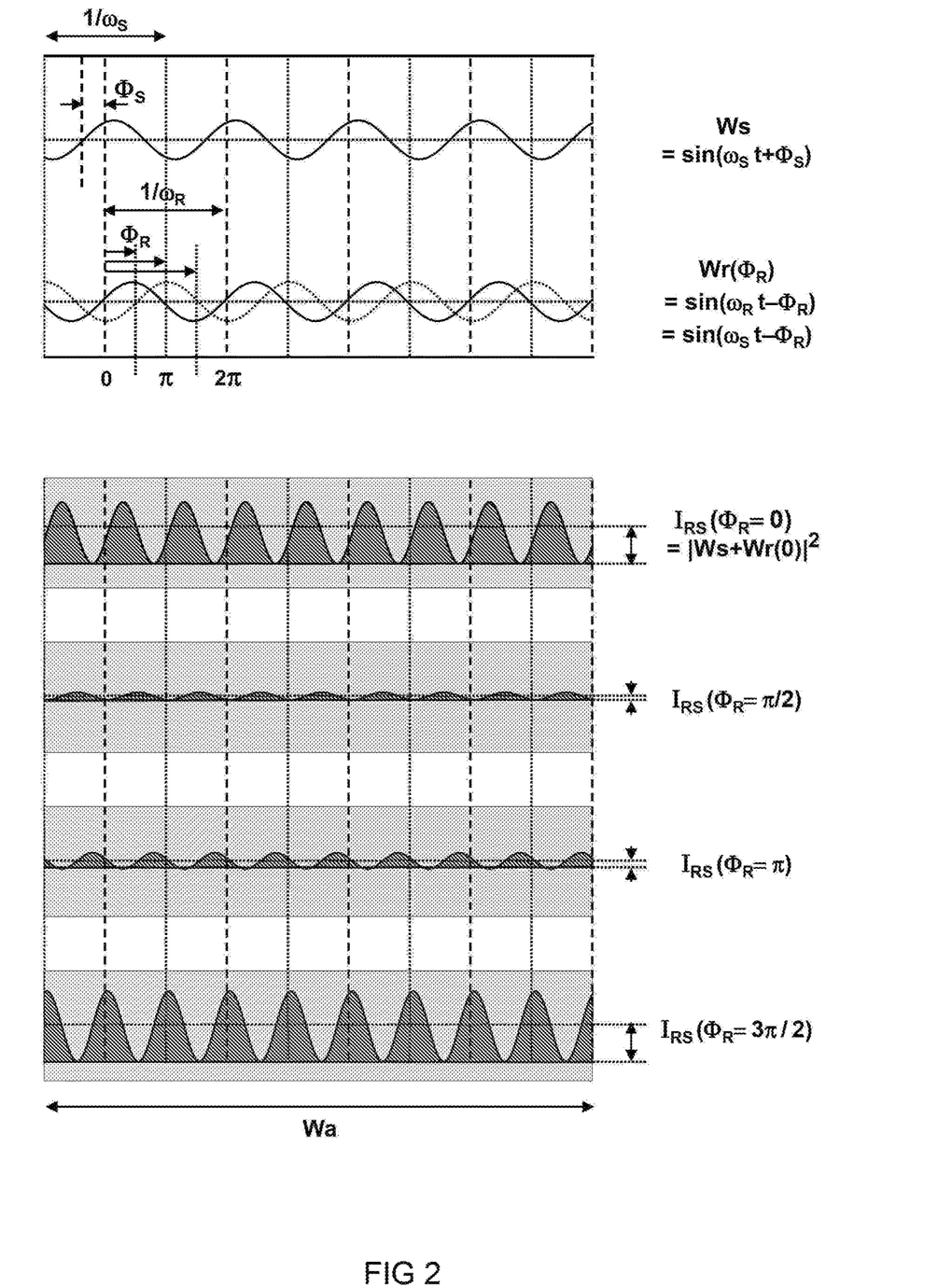
FIG. 2 schematically illustrates various signals corresponding to the first embodiment.

FIG. 2 schematically illustrates various signals e.g. according to the first embodiment of FIG. 1.

The top part of FIG. 2 shows two example waveforms Ws,Wr which may represent either a part the signal and reference wavefronts measured by a pixel of the image detector 12 or the average signals measured by the photodetector 13. In the example shown, the signal waveform Ws has an optical phase $\Phi_S$ which may vary for different pixels of the image detector 12 or be averaged on the photodetector 13. The reference waveform Wr is typically constant for all pixels when using a flat reference wavefront, or may have some other predetermined wavefront that is known.

The bottom part of FIG. 2 shows the interference signal $I_{RS}$ between the signal waveform Ws and reference waveform Wr for various steps of the relative phase $\Phi_R$ of the reference waveform Wr, in this case $\Phi_R$=0, π/2, p, 3π/2. For example, the light of the interference is sampled over a time period Wa to measure a series of (average) light intensities. While the sampling windows $W_A$ are shown here as occupying only certain fractions of the total detector time "t", more sampling windows can be added, or the time per windows may also be expanded, to use larger fractions of the total time, or even completely fill the total detector time for maximum light efficiency. The algorithms to determine the optical phases may be adjusted accordingly. Of course also other examples may be used with other algorithms.

Figure 3:
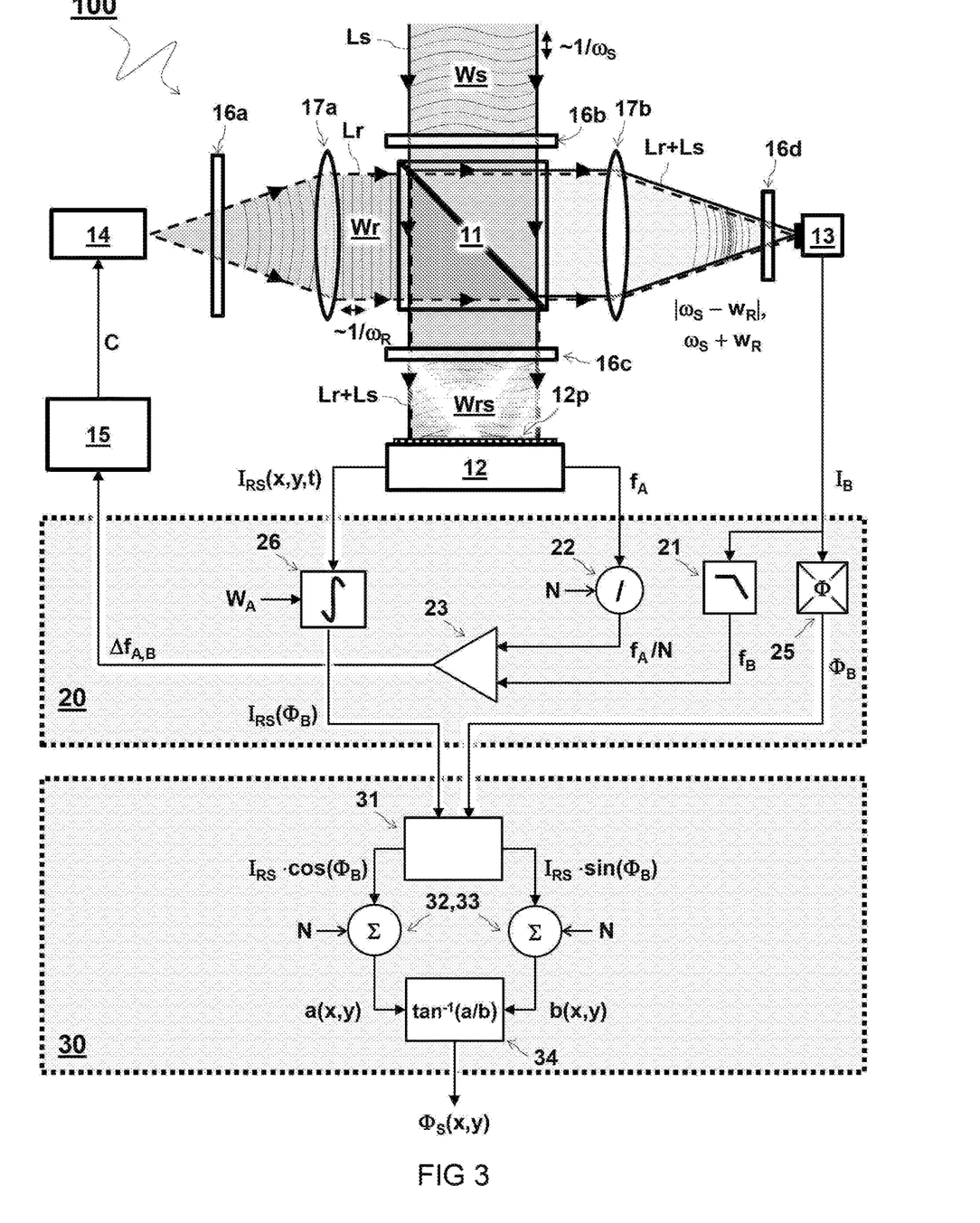
FIG. 3 schematically illustrates a second embodiment of a wavefront detector.

FIG. 3 schematically illustrates a second embodiment of a wavefront detector 100.

In some embodiments, e.g. as shown, the wavefront detector 100 is configured to calculate optical phases $\Phi_S$ of the signal wavefront Ws based on measurements of the interference pattern Wrs. In other or further embodiments, the feedback controller 20 is configured to control the reference light source 14 to maintain a difference frequency $|\omega_S-\omega_R|$ between the optical reference frequency $\omega_R$ and the optical signal frequency $\omega_S$ by generating a feedback control signal to the reference light source 14 in accordance with a predetermined beat frequency $f_B$. For example, in the embodiment shown, the beat frequency $f_B$ is received by the comparator 23 which generates a comparison output $\Delta f_{A,B}$ based on a difference of the beat frequency $f_B$ with a predetermined frequency N·fA. The generated output $\Delta f_{A,B}$ may be looped back to control the reference light source 14 e.g. via the light source driver 15 or directly (not shown).

In a preferred embodiment, a beat frequency $f_B$ is maintained equaling a fraction N of a sampling frequency $f_A$ of the image detector 12. For example, a sampling frequency $f_A$ may determine at what interval images are recorded by the image detector 12. Light falling on the image detector 12 may be integrated e.g. over a sampling window $W_A$. This windowing may be intrinsic to the image detector 12 or a separate integrator circuit 26, as shown may be provided to select specific time intervals at which to collect the interferograms e.g. corresponding to particular beat phases $\Phi_B$ of the measured interference signal $I_B$. Preferably, the beat frequency $f_B$ is based on an order N of a phase stepping algorithm used in calculating an optical phase $\Phi_S(x,y)$ of the signal wavefront Ws. For example, in the embodiment shown, a frequency divider 22 is configured to receive a sampling frequency signal fA from the image detector 12 and divide this by an integer value N as the desired beat frequency $f_B$. Accordingly the desired beat frequency $f_B=f_A/N$.

In one embodiment, a beat phase $\Phi_B$ is determined based on a measured interference signal $I_B$ between the combined signal and reference beams Lr+Ls, wherein interferograms $I_{RS}$ measured by the image detector 12 are weighted as a function of the beat phase $\Phi_B$. In the embodiment shown, the beat phase $\Phi_B$ is used as input together with respective measured interferograms $I_{RS}$, wherein the cosine or sine weighted interferograms are added by summing circuits 32,33 to yield respective sums a(x,y), b(x,y) and the inverse tangent of the quotient a/b is taken to calculate the optical signal optical phase $\Phi_S(x,y)$ of the signal beam Ls, e.g. as indicated by arithmetic circuit 34.

Figure 4:
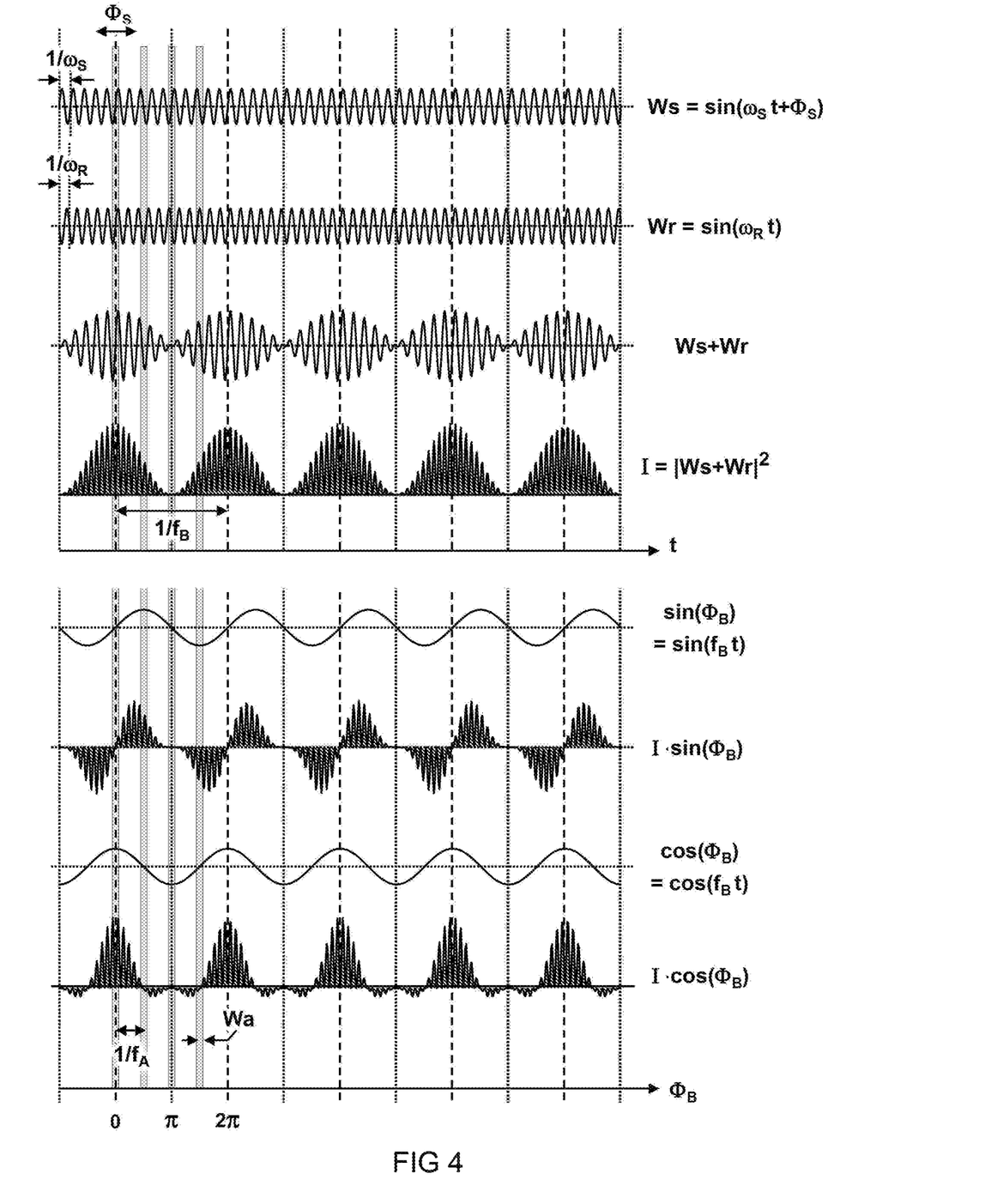
FIG. 4 schematically illustrates various signals corresponding to the second embodiment.

FIG. 4 schematically illustrates various signals e.g. corresponding to the second embodiment of FIG. 3.

The top part of FIG. 4 illustrates again two example waveforms Ws,Wr which may represent either a part the signal and reference wavefronts measured by a pixel of the image detector 12 or the average signals measured by the photodetector 13. In the example shown, the signal waveform Ws has an optical phase $\Phi_S$ which may vary for different pixels of the image detector 12 or be averaged on the photodetector 13. Different from FIG. 2, the reference waveform Wr has an optical frequency car that deviates from the frequency of the signal beam. The effect of this is that the signals are periodically in phase and out of phase as shown in the third graph depicting the sum Ws+Wr. On the pixels of the image detector or the photodetector this may result in an intensity I which has an envelope that varies with a beat frequency $f_B=|\omega_S-\omega_R|$. In some embodiments, the beat frequency may be controlled so that it is related to a sampling frequency $f_A$, e.g. that of the image detector. For example, $1/f_B=N\cdot1/f_A$, which can also be written as $f_B=f_A/N$. For example, N is the order of a phase stepping algorithm used to calculate the optical phases. In the example shown 4-step algorithm is used where N=4 with phase steps $\Phi_B=0$, $\pi/2$, $\pi$, $3\pi/2$.

The combined signal $I=|Wr+Ws|^2$ may also contain a sum frequency signal at $\omega_S+\omega_R$ but this is typically too fast to measure. It will be noted that the measured intensity may vary as a function of time. By sampling the signal at particular time intervals $W_A$ the interference for different relative phases $\Phi_B$. For example, relative phase $\Phi_B$ can be extracted from the beat signal, wherein the phase difference is 0 when the beat signal is maximal and the phase difference is n radians when the beat signal is minimal. This can be used to calculate the weighting factors sin ($\Phi_B$) and cos ($\Phi_B$) by which to multiply the beat signal intensities in a series of measurement windows $W_A$. The signal phase $\Phi S$ can be determined e.g. by summing the weighted signals in a series and taking the arctangent as described above.

For illustrative purposes, the frequencies $\omega_S$ and $\omega_R$ are chosen in this example relatively far apart compared to their optical frequencies (here $\omega_R=1.1*\omega_S$). In practice, the optical frequencies may be much higher by a factor thousand or more than the difference or beat frequency. For example, optical frequencies ωS, ωR may be on the order of tens or hundreds of THz depending on the wavelength, while the frequency difference may be on the order of kHz or MHz depending e.g. on the detection frequency. The top part of FIG. 4 illustrates again two example waveforms Ws,Wr which may represent either a part the signal and reference wavefronts measured by a pixel of the image detector 12 or the average signals measured by the photodetector 13.

For the purpose of clarity and a concise description, features are described herein as part of the same or separate embodiments, however, it will be appreciated that the scope of the invention may include embodiments having combinations of all or some of the features described. For example, optical and electrical components as described may be combined or split up into one or more alternative components. While the present disclosure features example embodiments of a wavefront detector, it will be appreciated that the same or similar aspects can be embodied as corresponding methods for determining a signal wavefront of a signal beam, e.g. comprising combining the signal beam with a reference beam; measuring an interference pattern of the combined signal and reference beams; and calculating a plurality of optical phases of the signal wavefront based on the measured interference pattern. Also, some aspects may be embodied as software instructions, e.g. on a non-transitory storage medium, which instructions, when executed may cause feedback control of a reference light source for a wavefront detector as described herein.

Of course, it is to be appreciated that any one of the above embodiments or processes may be combined with one or more other embodiments or processes to provide even further improvements in finding and matching designs and advantages. It is appreciated that this disclosure offers particular advantages to detection and correction of distorted wavefronts, and in general can be applied for any application wherein it is desired to determine a wavefront. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A wavefront detector for determining a signal wavefront of a signal beam received from a remote signal light source, the wavefront detector comprising:
   an internal reference light source that is separate from the remote signal light source and configured to generate a reference beam;
   a beam combiner configured to combine the signal beam with the reference beam to render a combined beam;

an image detector comprising an array of photosensitive pixels configured to receive the combined beam and to obtain a measurement of an interference pattern of the combined beam; and a feedback controller configured to carry out:
receiving an interference signal based on measurement of at least part of the combined beam, and
controlling generation of the reference beam by a feedback loop based on the interference signal to adapt the reference beam with respect to the signal beam.

2. The wavefront detector according to claim 1, wherein at least one characteristic of the reference beam is adapted with respect to corresponding characteristics of the signal beam, wherein the at least one characteristic is taken from the group consisting of: a frequency, a phase and a polarization.

3. The wavefront detector according to claim 2, comprising a wavefront imager configured to calculate a plurality of optical phases of the signal wavefront based on the measurement of the interference pattern.

4. The wavefront detector according to claim 2, wherein the feedback controller is configured to:
determine, based on the interference signal, a beat frequency of a difference frequency between an optical signal frequency of the signal beam and an optical reference frequency of the reference beam, and
control the optical reference frequency in the generation of the reference beam by a feedback loop based on the beat frequency.

5. The wavefront detector according to claim 2, wherein the feedback controller is configured to control the reference light source to maintain a difference frequency between the optical reference frequency and the optical signal frequency by generating a feedback control signal to the reference light source in accordance with a controlled beat frequency.

6. The wavefront detector according to claim 5, wherein the beat frequency is controlled to equal a predetermined fraction of a sampling frequency of the image detector.

7. The wavefront detector according to claim 6, wherein the predetermined fraction is based on an order of a phase stepping algorithm used in calculating an optical phase of the signal wavefront.

8. The wavefront detector according to claim 2, wherein a beat phase is determined based on a measurement of the interference signal, and
wherein interferograms measured by the image detector are weighted as a function of the beat phase.

9. The wavefront detector according to claim 2, wherein the feedback controller is configured to control the reference light source to match the optical reference frequency with the optical signal frequency by generating a feedback control signal to the reference light source to minimize or remove the measured beat frequency.

10. The wavefront detector according to claim 2, wherein the feedback controller is configured to:
determine, based on the interference signal, a relative optical phase between the reference beam and signal beam, and
control an optical phase of the reference beam by a feedback loop based on the determined relative optical phase.

11. The wavefront detector according to claim 2, wherein the wavefront detector comprises a phase stepper configured to set a relative optical phase of the reference beam to a sequence of different phase values·2π/N), wherein for each relative optical phase a respective interferogram of the combined signal and reference beams is projected onto the image detector and recorded, and
wherein the recorded interferograms are combined to calculate, for each pixel of the image detector, an optical phase in the signal beam.

12. The wavefront detector according to claim 2, wherein a relative optical frequency difference and/or relative optical phase between the reference and signal beams is determined from a combination of two measurements indicative of different polarizations in the combined beam.

13. The wavefront detector according to claim 2, wherein the interference signal is measured by a photodetector configured to receive an integrated image of the combined beam.

14. The wavefront detector according to claim 13, wherein the photodetector is separate from the image detector.

15. The wavefront detector according to claim 13, wherein the photodetector has a higher detection frequency than the image detector.

16. A method for determining a signal wavefront of a signal beam generated by a remote light source, the method comprising:
receiving the signal beam;
generating a reference beam using an internal light source;
combining the signal beam with the reference beam to render a combined beam;
obtaining a measurement of an interference pattern of the combined beam; and
calculating a plurality of optical phases of the signal wavefront based on the measurement of the interference pattern;
wherein generation of the reference beam is controlled by a feedback loop based on an interference signal between at least part of the combined beam to adapt characteristic of the generated reference beam with respect to those of the received signal beam.

17. The method according to claim 16, wherein at least one characteristic of the reference beam is adapted with respect to corresponding characteristics of the signal beam, wherein the at least one characteristic is taken from the group consisting of: a frequency, a phase and a polarization.

18. The method according to claim 17, further comprising:
determining, based on the interference signal, a beat frequency of a difference frequency between an optical signal frequency of the signal beam and an optical reference frequency of the reference beam, and
controlling the optical reference frequency in the generation of the reference beam by a feedback loop based on the beat frequency.

19. The method according to claim 17, further comprising:
controlling the reference light source to maintain a difference frequency between the optical reference frequency and the optical signal frequency by generating a feedback control signal to the reference light source in accordance with a controlled beat frequency.

20. The method according to claim 17, further comprising:
determining, based on the interference signal, a relative optical phase between the reference beam and signal beam, and controlling an optical phase of the reference beam by a feedback loop based on the determined relative optical phase.

* * * * *